(12) United States Patent
Pora

(10) Patent No.: US 9,552,221 B1
(45) Date of Patent: Jan. 24, 2017

(54) MONITORING APPLICATION EXECUTION USING PROBE AND PROFILING MODULES TO COLLECT TIMING AND DEPENDENCY INFORMATION

(71) Applicant: GOOGLE INC., Mountain View, CA (US)

(72) Inventor: Mihai Pora, Kraków (PL)

(73) Assignee: GOOGLE INC., Mountain View, CA (US)

( * ) Notice: Subject to any disclaimer, the term of this patent is extended or adjusted under 35 U.S.C. 154(b) by 287 days.

(21) Appl. No.: 14/139,588

(22) Filed: Dec. 23, 2013

(51) Int. Cl.
| | | |
|---|---|---|
| *G06F 9/46* | (2006.01) | |
| *G06F 11/34* | (2006.01) | |
| *G06F 11/30* | (2006.01) | |
| *G06F 11/36* | (2006.01) | |
| *G06F 11/32* | (2006.01) | |

(52) U.S. Cl.
CPC ............ *G06F 9/46* (2013.01); *G06F 11/30* (2013.01); *G06F 11/34* (2013.01); *G06F 11/32* (2013.01); *G06F 11/36* (2013.01)

(58) Field of Classification Search
CPC ............ G06F 9/46; G06F 11/30; G06F 11/32; G06F 11/34; G06F 11/36
See application file for complete search history.

(56) References Cited

U.S. PATENT DOCUMENTS

| | | | | | |
|---|---|---|---|---|---|
| 5,692,193 | A * | 11/1997 | Jagannathan | ........... | G06F 8/451 711/6 |
| 6,145,121 | A * | 11/2000 | Levy | .................. | G06F 11/3461 703/22 |
| 6,535,928 | B1 * | 3/2003 | Glass | .................... | G06F 9/4435 719/316 |
| 7,328,439 | B1 * | 2/2008 | Clark | ...................... | G06F 9/542 719/318 |
| 7,392,508 | B1 * | 6/2008 | Podowski | ........... | G06F 11/3612 717/125 |
| 7,457,722 | B1 * | 11/2008 | Shain | .................. | G06F 11/3495 702/182 |
| 7,587,399 | B2 * | 9/2009 | Kilian | ...................... | H04L 67/02 |
| 8,060,543 | B1 * | 11/2011 | Ciot | ........................ | G06F 11/32 707/820 |
| 8,549,540 | B1 * | 10/2013 | Dixon | .................... | G06F 9/546 719/314 |

(Continued)

*Primary Examiner* — Benjamin Wu
(74) *Attorney, Agent, or Firm* — Birch, Stewart, Kolasch & Birch, LLP

(57) ABSTRACT

A system and method for analyzing application execution of multi-threaded applications is disclosed. An exemplary system includes a portable inter-thread communication mechanism; a profiling module; and an external interpretation application. A communication mechanism may be used to implement communication among a plurality of application threads. Responsive to an indication that an application should be monitored, a profiling module may profile at least one of a plurality of application threads to monitor and measure the thread's communications. Profiling information may be logged and the log may be provided to the external interpretation application. The external interpretation application may then parse the log and produce a graphic representation of execution metrics based on the information parsed from the log. The graphic representation may allow an end-user to acquire information and determine several statistics regarding the application's execution.

15 Claims, 11 Drawing Sheets

(56) References Cited

U.S. PATENT DOCUMENTS

| | | | | |
|---|---|---|---|---|
| 2002/0087958 | A1* | 7/2002 | Krause | G06F 9/44563 717/166 |
| 2003/0056200 | A1* | 3/2003 | Li | G06F 11/3612 717/128 |
| 2005/0262512 | A1* | 11/2005 | Schmidt | G06F 9/465 719/310 |
| 2006/0070051 | A1* | 3/2006 | Kuck | G06F 9/544 717/162 |
| 2006/0248200 | A1* | 11/2006 | Stanev | H04L 67/14 709/227 |
| 2008/0178293 | A1* | 7/2008 | Keen | H04L 41/12 726/23 |
| 2008/0320440 | A1* | 12/2008 | Meijer | G06F 8/72 717/108 |
| 2009/0049429 | A1* | 2/2009 | Greifeneder | G06F 11/3495 717/128 |
| 2009/0144305 | A1* | 6/2009 | Little | G06F 17/30079 |
| 2009/0248381 | A1* | 10/2009 | Liu | G06F 11/3688 703/13 |
| 2009/0276835 | A1* | 11/2009 | Jackson | G06F 21/54 726/4 |
| 2010/0281488 | A1* | 11/2010 | Krishnamurthy | G06F 11/3495 718/106 |
| 2011/0107307 | A1* | 5/2011 | Liu | G06F 11/3664 717/125 |
| 2011/0239186 | A1* | 9/2011 | Zinkovsky | G06F 9/45516 717/107 |
| 2011/0258594 | A1* | 10/2011 | Syme | G06F 8/445 717/106 |
| 2012/0089966 | A1* | 4/2012 | Martin | G06F 11/3466 717/133 |
| 2012/0131309 | A1* | 5/2012 | Johnson | G06F 9/30 712/41 |
| 2012/0210320 | A1* | 8/2012 | Goetz | G06F 9/46 718/100 |
| 2012/0304172 | A1* | 11/2012 | Greifeneder | G06F 9/45504 718/1 |
| 2013/0103715 | A1* | 4/2013 | Beckman | G06F 9/547 707/770 |
| 2014/0215443 | A1* | 7/2014 | Voccio | G06F 11/3612 717/128 |
| 2014/0289712 | A1* | 9/2014 | Gupta | G06F 11/3608 717/132 |
| 2016/0239217 | A1* | 8/2016 | Kilner | G06F 3/0608 |

* cited by examiner

```
CommunicationMechanism.Run() {
  while (true) {
    closure = ReadClosureFromQueue()
    closure.Execute()
  }
}

CommunicationMechanism.Dispatch(Closure closure) {
  WriteClosureToQueue(closure)
}
```

FIG. 1

```
TimingProbeContext.getCurrentContext() {
    if(thread-specific current_context is initialized) {
        return current_context
    }
    else {
        return null
    }
}
```

FIG. 2

```
DispatchProbe.DispatchProbe() {
    start_time = getSystemTimeInMicros()
    label = TimingProbeContext.getCurrentContext().label()
    start_thread_name = getSystemThreadName()
}

DispatchProbe.CreateTimingProbeContextAndLog{
    timing_probe_context = CreateTimingProbeContext(label)
    stop_time = getSystemTimeInMicro()
    stop_thread_name = getSystemThreadName()
    Log( label, start_thread_name, start_time, stop_thread_name, stop_time )
    return timing_probe_context
}
```

FIG. 3

```
TimingProbeContextBinder() {
  if (dispatch_probe != null) {
    TimingProbeContext context =
      dispatch_probe.CreateTimingProbeContextAndLog()
    wrapped_closure.Execute()
    context.Destroy()
  } else {
    wrapped_closure.Execute()
  }
}

TimingProbeContextBinder(DispatchProbe probe, Closure closure) {
  dispatch_probe = probe
  wrapped_closure = closure
}
```

FIG. 4

```
CommunicationMechanism.Dispatch(Closure closure) {
    DispatchProbe dispatch_probe = new DispatchProbe()
    TimingProbeContextBinder wrapper = new
        TimingProbeContextBinder(dispatch_probe, closure)
    Closure wrapping_closure = new Closure (wrapper)
    WriteClosureToQueue(wrapping_closure)
}
```

FIG. 5

| Step No. | Operation Performed | Execution Thread | Typical duration (ms) |
| --- | --- | --- | --- |
| 1 | Receive click | EventThread | <1 |
| 2 | Detect object clicked and invoke OnClick | MainThread | <1 |
| 3 | Create and send network request for retrieving the image | NetworkThread | <1 |
| 4 | Wait for the server to respond (without blocking the application) | NetworkThread | 500-1000 |
| 5 | Load the whole image from the server response | NetworkThread | 100 |
| 6 | Decode the image from JPEG to RGBA | MainThread | 20 |
| 7 | Load RGBA data to graphics memory | RenderThread | 5 |
| 8 | Once image is loaded, update the UI model | MainThread | <1 |
| 9 | Screen is refreshed and shows the new image | RenderThread | 10 |

FIG. 8

Sample Log:
TimingProbe:LoadPhoto:OnEvent:EventThread:1000:1000
DispatchProbe:LoadPhoto:EventThread:1000:MainThread:1001
TimingProbe:LoadPhoto:OnClick:MainThread:1001:1001
DispatchProbe:LoadPhoto:MainThread:1001:NetworkThread:1001
TimingProbe:LoadPhoto:LoadImage:NetworkThread:1001:1002
TimingProbe:Refresh:OnRefresh:RenderThread:1016:1026
TimingProbe:Refresh:OnRefresh:RenderThread:1033:1063
TimingProbe:Refresh:OnRefresh:RenderThread:1050:1060
TimingProbe:Refresh:OnRefresh:RenderThread:1066:1076

TimingProbe:Refresh:OnRefresh:RenderThread:1483:1493
DispatchProbe:LoadPhoto:NetworkThread:1002:NetworkThread:1500
TimingProbe:Refresh:OnRefresh:RenderThread:1500:1510
TimingProbe:Refresh:OnRefresh:RenderThread:1516:1520
TimingProbe:Refresh:OnRefresh:RenderThread:1533:1540
TimingProbe:LoadPhoto:OnNetworkResponse:NetworkThread:1500:1550
DispatchProbe:LoadPhoto:NetworkThread:1550:MainThread:1550
TimingProbe:Refresh:OnRefresh:RenderThread:1550:1560
TimingProbe:Refresh:OnImageLoaded:RenderThread:1550:1570
DispatchProbe:LoadPhoto:MainThread:1570:RenderThread:1576
TimingProbe:Refresh:OnRefresh:RenderThread:1566:1576
TimingProbe:LoadPhoto:LoadTexture:RenderThread:1576:1581
DispatchProbe:LoadPhoto:RenderThread:1581:MainThread:1581
TimingProbe:LoadPhoto:TextureReady:MainThread:1581:1581
TimingProbe:Refresh:OnRefresh:RenderThread:1583:1593

FIG. 9

MONITORING APPLICATION EXECUTION USING PROBE AND PROFILING MODULES TO COLLECT TIMING AND DEPENDENCY INFORMATION

BACKGROUND

The execution time of a multi-threaded application can be slow even if the application uses a small amount of CPU, I/O, and/or memory. There may be several explanations for an application's threads' slow execution times. For example, one thread may do numerous computations while other threads are idle, either waiting for the executing thread's result or because they have finished processing. When threads are waiting while one thread is executing, CPU utilization is only 1/N where N is the number of CPU cores.

Another reason for slow execution times is that an application may be designed to execute in sequence so threads pass information one to the other and sequentially execute. An application designed sequentially does not use more than one CPU core at a time. Although CPU usage in both of these examples is low, slowness may occur in execution of applications using these designs.

Regardless of the reason for application thread slowness, there is no convenient method to find the exact causes of execution slowness especially when applications are designed for cross-platform execution. As recognized by the inventor, there should be an easier way to analyze the performances of multi-threaded applications executing on multi-core CPUs in order to determine the cause of slow execution times and provide information so a software engineer can establish ways to speed up applications.

SUMMARY

This specification describes technologies relating to multi-threaded application execution in general, and specifically to methods and systems for visualizing and profiling multi-threaded applications in order to determine causes for slow execution times.

In general, one aspect of the subject matter described in this specification can be embodied in a system and method for analyzing execution of multi-threaded applications. An example system includes one or more processing devices and one or more storage devices storing instructions that, when executed by the one or more processing devices, cause the one or more processing devices to implement a portable inter-thread communication mechanism that allows messages to be passed among threads; a profiling module that collects application execution information; and an application that reads execution logs of an application profiled by the profiling module, extracts profiling information, and creates a graphic representation of the profiled application's execution. An example method includes implementing communication among a plurality of application threads through the use of closures; receiving an indication that an application should be monitored; profiling at least one of the plurality of application threads to monitor and measure the thread's communications; and logging information obtained from profiling at least one of the plurality of application threads in an application log.

These and other embodiments can optionally include one or more of the following features: an application log may be parsed and a graphic representation may be produced based on the parsed application log to illustrated thread execution metrics to a user; a graphic representation may include a timescale, threads, and arrows pointing from one thread to another indicating that a message was passed among threads or to the same thread; a profiling module may include a timing probe class, which is a utility class that indicates whether a user would like to monitor an application's execution; a profiling module may include a dispatch probe class, which measures the time between an instance of the class's creation and destruction; a profiling module includes a timing probe context binder, which is a function object that wraps a closure with a piece of code that executes a method in the dispatch probe class for creating a timing probe context and log; a graphic representation may illustrate timing probes that were active on each thread for a specific time period; a graphic representation may illustrate message traffic among threads; and a graphic representation may illustrate a plurality of threads established by an application.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1 illustrates exemplary methods of a core communication class.

FIG. 2 illustrates a partial implementation of an exemplary timing probe context class.

FIG. 3 illustrates an implementation of an exemplary dispatch probe class.

FIG. 4 represents an exemplary timing probe context binder class.

FIG. 5 illustrates a modified version of the exemplary core communication class as depicted in FIG. 1.

FIG. 8 illustrates example steps of an example application when the application reacts to an event and loads an image.

FIG. 9 is an example activities log of the example application of FIG. 8.

DETAILED DESCRIPTION

Figure 6:
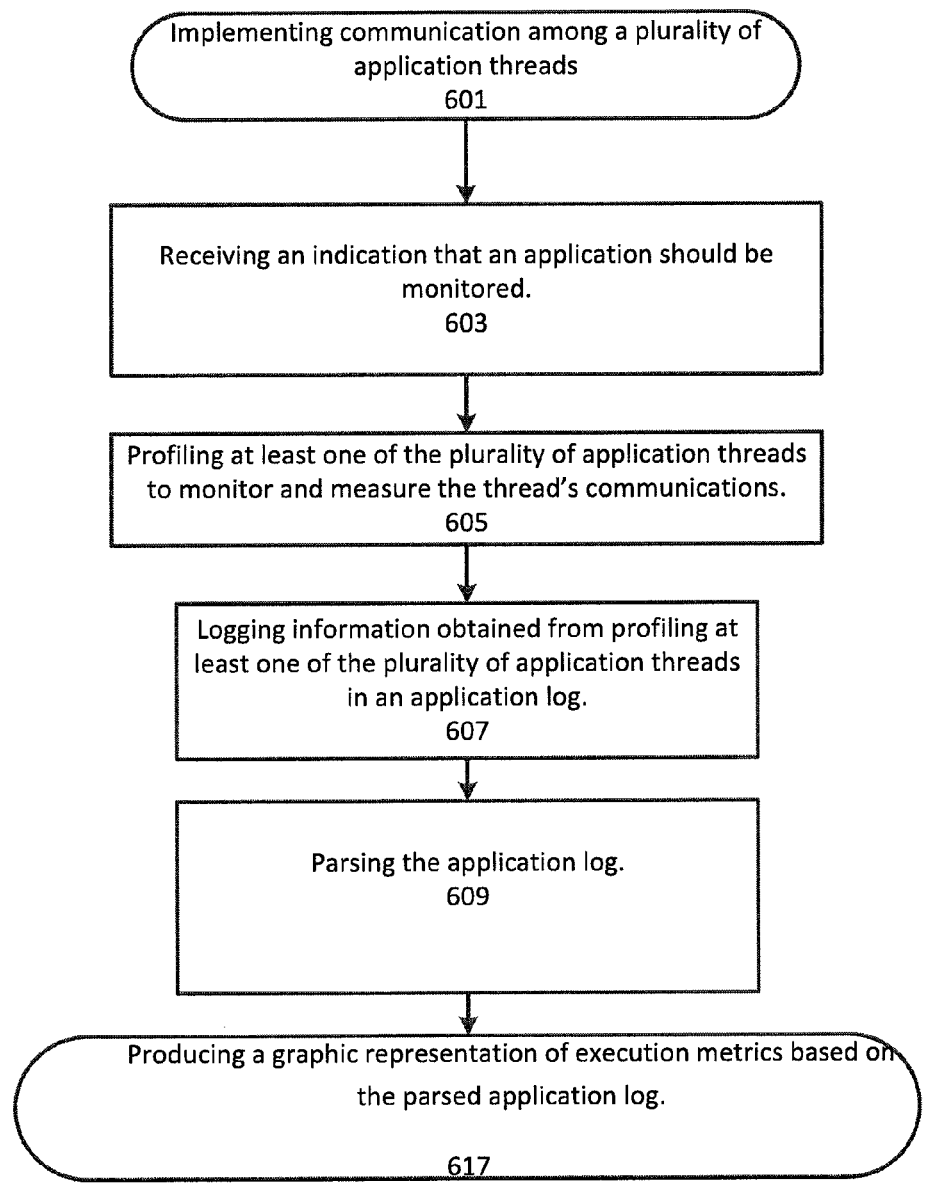
FIG. 6 is a flow diagram of an exemplary method for visualizing and profiling multi-threaded applications in order to determine causes for slow execution times.

Aspects of the inventive concepts may include a system and method for analyzing performance of multi-threaded applications executing on multi-core CPUs including cross-platform applications. In order to accurately analyze performance, an exemplary system may produce easy to use profiling information that can be used to monitor and measure communications among threads.

According to an exemplary system, communication information may be monitored and recorded using a portable inter-thread communication mechanism and profiling module. Since the inter-thread communication mechanism is portable, the mechanism can be used when writing applications for different platforms, reducing the effort required for writing the same application for different platforms. The recorded communication information may then be used by an external interpretation application to provide visual representations of the information as discussed below. To provide this functionality, an exemplary system may include: a portable inter-thread communication mechanism; a profiling module; and an external interpretation application.

An exemplary inter-thread communication mechanism may provide a core class that includes a queue to hold messages from one thread to another that are waiting to be executed. An exemplary core class also includes two methods, a run method and a dispatch method as illustrated in FIG. 1. A run method may be an infinite loop that runs on the thread waiting for messages on the message queue and executing them in order, one at a time. A dispatch method may be a method that can be invoked from another thread to insert a message into the thread's message queue, effectively scheduling the message for execution. Threads that are synchronized using message passing may communicate with one another by transferring messages as closures. A closure is a function that retains information about the environment in which it was created. Knowing the environment allows the closure to use variables that are not local during the closure's execution. When the closure is executed, it binds non-local variables to corresponding values of variables that were in the scope at the time the closure was created. The scope is the context within a computer application in which the name of a variable or some other identification is valid and can be used or within which a variable declaration has effect.

To use the communication mechanism, each thread within an exemplary system may contain an exemplary core class with run and dispatch methods as well as a message queue. A thread may execute its own Run method to read messages from the queue. However, the Dispatch method, to write messages to the queue, may be executed in some other thread by an object that needs to send a message, or a closure, to be executed in the first thread. An object that needs to send a message to a thread should have a reference to the thread's core class in order to call the thread's dispatch method.

An exemplary profiling module may require that several classes be implemented within an application so that application execution information can be collected and processed during application execution. These classes may include: a timing probe class; a dispatch probe class; and a timing probe context binder.

An exemplary timing probe context class, as partially illustrated in FIG. 2, may be a utility class that indicates whether a user would like to monitor an application's execution. This class may contain a thread-local static variable that indicates whether profiling should be performed for an application's execution. To monitor execution, an instance of a timing probe context class may be created with a specific description label. The timing probe context class may provide a label about the current profiling information that may be initialized in each of the threads of the application. At any given time, some threads of the application may have monitoring functionality enabled while other threads may not. When monitoring is enabled, an exemplary timing probe context class provides a valid timing probe context object. When monitoring is disabled, an exemplary class returns a null value.

An exemplary dispatch probe class may measure the time between an instance of the class's creation and destruction. This class allows for the creation of objects in one thread that are destroyed in another so that the time from creation to destruction can be measured. The class may also allow an exemplary system to measure the CPU core usage when executing an application. An instant dispatch probe class may additionally copy information about a current timing probe context when it is created and may recreate the context in the thread where the dispatch probe is being used when it is destructed. In order to provide this functionality, an exemplary dispatch probe class may contain a method for creating a timing probe context and log. FIG. 3 illustrates an example of such a method.

An exemplary dispatch probe class may have a constructor that records context about instance execution including time in microseconds, current thread name, and current context label. As discussed above, an exemplary dispatch probe class may also have a method for copying information about the current timing probe context. When the dispatch probe instance is destructed, the context is re-created where the dispatch probe is used. The dispatch probe's destructor may contain code for destroying the dispatch probe as well as code that captures the dispatch probe's destruction moment, which indicates that the message to which the dispatch probe was attached will execute in a new thread. An example embodiment may measure the time taken to pass the message. The message's destination thread may also be found and the profiling context may be re-created so that further messages created in the thread will receive new probes. During application execution, a dispatch probe class may produce logs about execution and messages passed among threads.

An exemplary timing probe context binder class may be a function object that can wrap a closure with a piece of code that executes the dispatch probe class method for creating a timing probe context and log. This function object may act both as an object and as a function to create closures. FIG. 4 illustrates a default constructor for a timing probe context binder instance.

An external interpretation application may read the execution logs of a profiled application, extract profiling information, and create an easy-to-read and easy-to-interpret diagram or other graphic representation explaining the execution of the profiled program. An exemplary external interpretation application may parse the logs produced by the profiling mechanism and produce graphics containing elements such as: a timescale, threads, CPU usage, and messages passed.

An exemplary system for analyzing performance of multi-threaded applications executing on multi-core CPUs includes simple modifications to the communication mechanism's dispatch method as shown in FIG. 5 in order to profile thread processes. As illustrated, the dispatch method of FIG. 1 is modified in FIG. 5 to contain functionality for recording messages passed among threads and to determine when a thread's process has started and ended. First, a dispatch probe is instantiated. If a timing probe context was already active when the dispatch probe is created, the active timing probe context may be copied in the dispatch probe. A function may be created that, when executed, will create a timing probe context and log before executing a specified closure. A closure may then be created from the function. The closure can be sent as a message to another thread.

An exemplary method begins with implementing communication among a plurality of application threads as illustrated in FIG. 6 (601). An indication that an application should be monitored may then be received (603). At least one of the application's threads may be profiled to monitor and measure the thread's communications (605). Information obtained by profiling the application's thread(s) may be logged in one or more application logs (607). For example, during execution of an application, the Dispatch Probe Class and the Timing Probe Class discussed above may produce application logs about execution and messages passed among threads. The log(s) may be provided to an external interpretation application, described above. The log(s) may be parsed (609). Then, a graphic representation of execution metrics may be produced based on the parsed application log(s) (617). This graphic representation may be provided to an end-user so that the user may be able to visually analyze an application threads' execution times.

Figure 7:
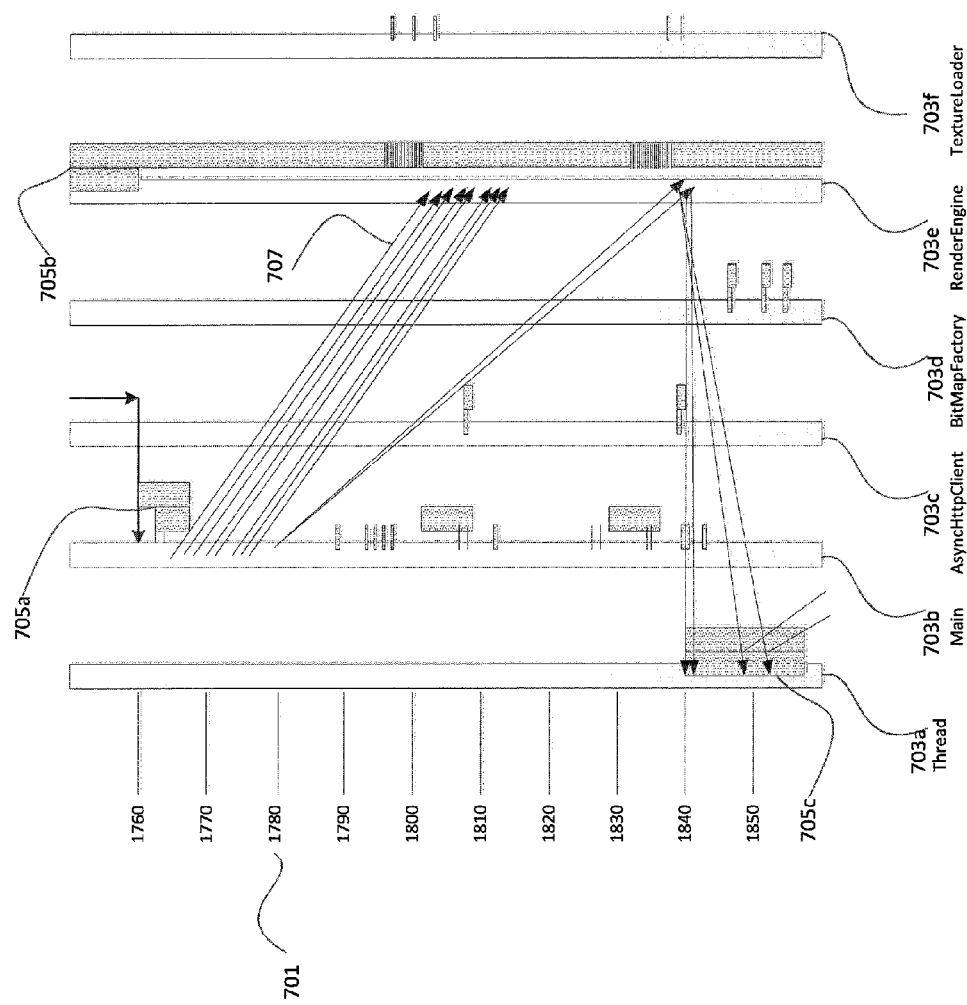
FIG. 7 is an example graphic representation of an exemplary system.

An exemplary graphic representation is illustrated in FIG. 7. The graphic representation may contain the following elements: a timescale in time units such as milliseconds or microseconds (on the vertical axis, 701); threads (703a . . . 703o, represented as bars parallel with the timescale for each executed thread in the application; on each thread, the timing probes that were active at certain times may be highlighted (705, shaded bars) to show CPU usage; an arrow pointing from a thread to another (707) may indicate that a message was passed among threads or to the same thread, the beginning of the arrow may indicate when and where the Dispatch Probe was created and the tip of the arrow may indicate when and where the Dispatch Probe was destroyed and the closure was executed.

An end-user may be able to determine several statistics regarding an application's execution using the graphic representation including: the time required to execute different parts of the application's processing; the threads involved in processing; messages that were generated during execution; the amount of time messages were delayed; the amount of time and/or CPU required to execute a single message; and the CPU usage during the measurements.

An example system for analyzing performance of multi-threaded applications executing on multi-core CPUs including cross-platform applications may be used to show an end user what happens in an example application when the application responds to a click by loading and displaying an image.

To ensure smooth operation, the application designer may have split the application in four threads. A main thread may run the core logic and the model of the application. A render thread may update the user interface by redrawing the screen after each screen refresh. A good application design may require that this thread run 60 times per second and finish as fast as possible and in less than 16 milliseconds. If the thread does not meet these requirements, the refresh rate may drop below 60 frames per second and the end user may perceive the application as "stuttering." This thread may also be responsible for loading images into graphics memory. An event thread may run an event loop, capturing and interpreting all input events such as mouse clicks, touches, and key inputs. Once an event is identified, the event is forwarded to the main thread so the main thread can respond to the event. A network thread may manage all network communications. This thread may need to be separate from the main thread to ensure that the main thread is not blocked by network events which need to be handled immediately.

In an example application, reacting to an event and loading an image involves the steps illustrated in FIG. 8. A click may be received by the event thread. The main thread may then detect that an object was clicked and invoke an OnClick method. The network thread may create and send a network request for retrieving an image associated with the click. This network thread may wait for the server to respond without blocking the application and then load the whole image from the server response. The main thread may decode the image from JPEG to RGBA. A render thread may load the RGBA data to graphics memory. The main thread may update the user interface model once the image is loaded. Then, the render thread may refresh the screen and show the new image. Each of these steps may involve a message being passed from one thread to another, except for the network response waiting and screen refresh.

While the application is running, the application may log activities as shown in FIG. 9. An example captured log may contain two kinds of records, timing probe records and dispatch probe records. An example timing probe record may be in the form: <RecordType>:<Label>: <MethodName>:<thread_name>:<start_time_ms>:<end_time_ms>. An example dispatch probe may be in the form: <RecordType>:<Label>:<start_thread_name>:<start_time_ms>: <stop_thread_name>:<stop_time_ms>.

Figure 10:
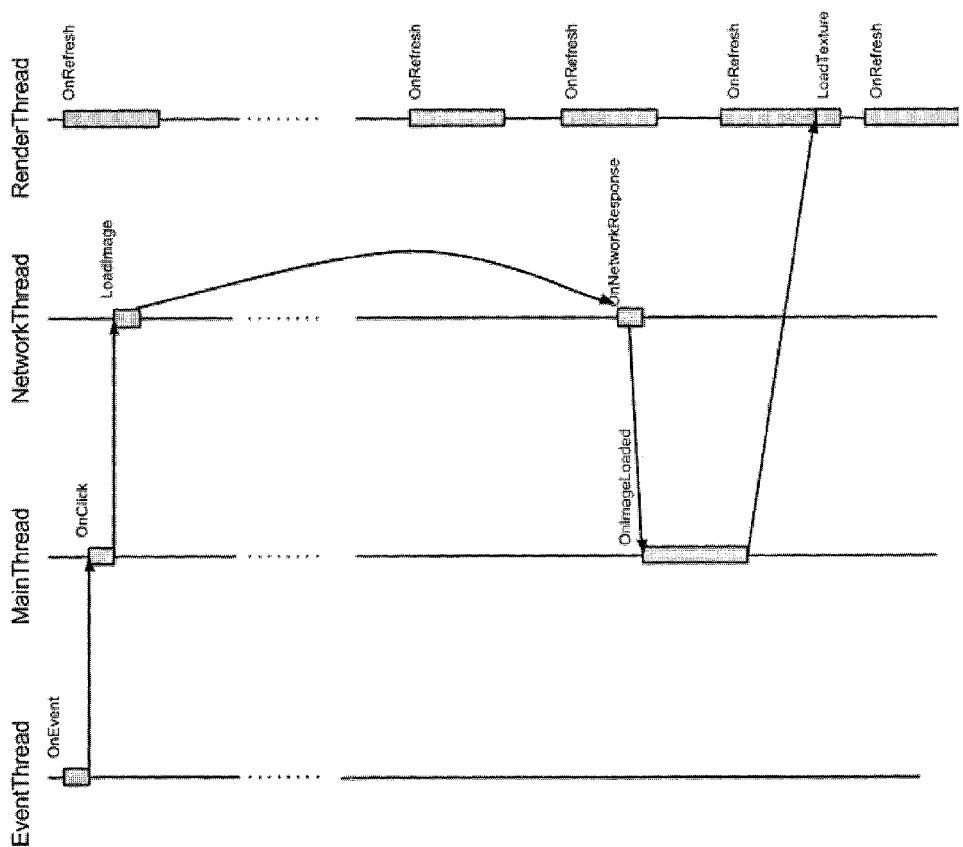
FIG. 10 is an example graphic representation of the application performing the steps of FIG. 8.

FIG. 10 shows an example graphic representation of the application responding to a click by loading and displaying an image. Each of the four threads are shown as parallel bars. On each thread, the timing probes that were active at certain times are shown. The arrow pointing from one thread to another may indicate that a message was passed among thread, or on the same thread. The beginning of the arrow may indicate where and when the Dispatch Probe was created and the tip of the arrow may indicate where and when the Dispatch Probe was destroyed and the closure was executed.

Figure 11:
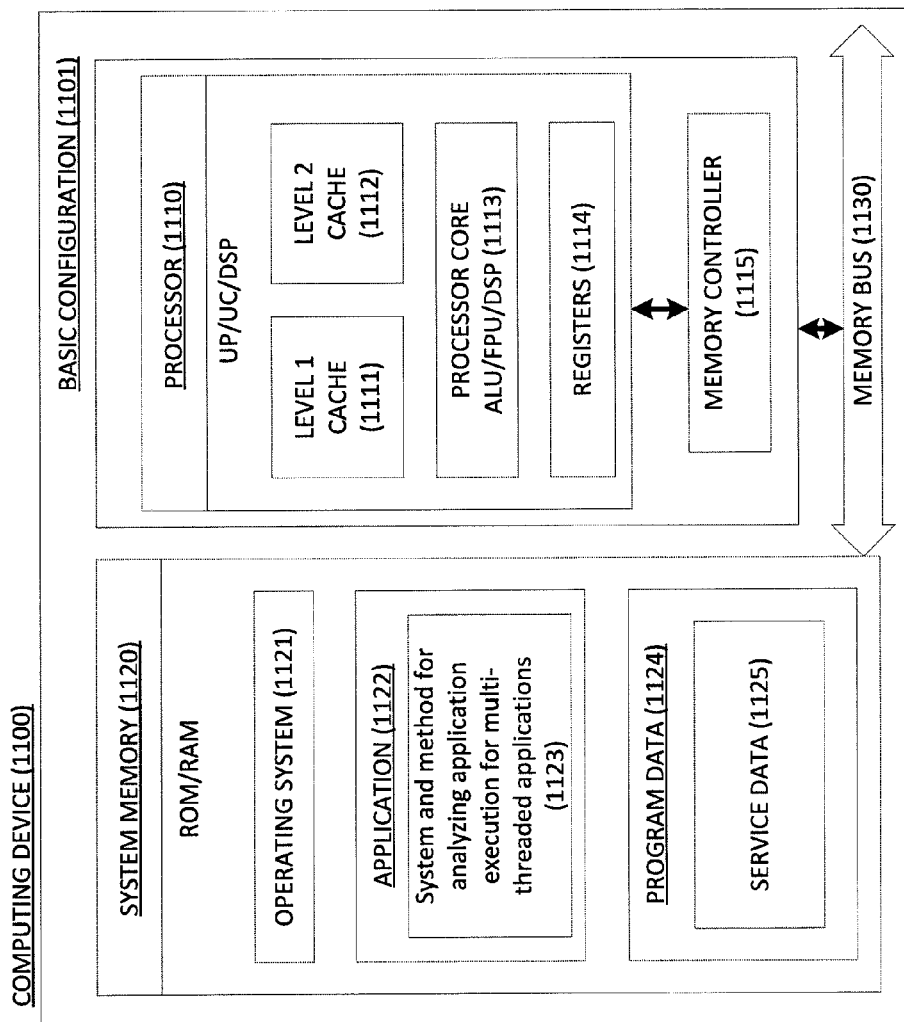
FIG. 11 is a block diagram illustrating an exemplary computing device.

FIG. 11 is a high-level block diagram showing an application on a computing device (1100). The application analyzes a multi-threaded application's execution. In a basic configuration (1101), the computing device (1100) typically includes one or more processors (1110), system memory (1120), and a memory bus (1130). The memory bus is used to perform communication between processors and system memory.

Depending on different configurations, the processor (1110) can be a microprocessor (µP), a microcontroller (µC), a digital signal processor (DSP), or any combination thereof. The processor (1110) can include one or more levels of caching, such as an L1 cache (1111) and an L2 cache (1112), a processor core (1113), and registers (1114). Depending on the configuration of a processor, the processor may include one or more processor cores and one or more sets of registers. The processor core (1113) can include an arithmetic logic unit (ALU), a floating point unit (FPU), a digital signal processing core (DSP Core), or any combination thereof. In multi-core architectures, each core may include L1 cache, execution units (ALU, FPU, DSP), and registers. All cores may share L2 cache and system bus interfaces. A memory controller (1116) can either be an independent part or an internal part of the processor (1110).

Depending on the desired configuration, the system memory (1120) can be of any type including, but not limited to, volatile memory (such as RAM), non-volatile memory (such as ROM, flash memory, etc.) or any combination thereof. System memory (1120) typically includes an operating system (1121), one or more applications (1122), and program data (1124). The application (1122) may include a system and method for analyzing application execution for multi-threaded applications. Program Data (1124) includes storing instructions that, when executed by the one or more processing devices, implement a system and method for analyzing application execution for multi-threaded applications. In some embodiments, the application (1122) can be arranged to operate with program data (1124) on an operating system (1121).

The computing device (1100) can have additional features or functionality, and additional interfaces to facilitate communications between the basic configuration (1101) and any required devices and interfaces.

System memory (1120) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device (1100). Any such computer storage media can be part of the device (1100).

The computing device (1100) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that includes any of the above functions. The computing device (1100) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples, can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject mater described herein applies regardless of the particular type of non-transitory signal bearing medium used to actually carry out the distribution. Examples of non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for analyzing execution of multi-threaded applications, the system comprising:
   one or more processors and
   one or more storage devices storing instructions that, when executed by the one or more processors, cause the one or more processors to implement:
      a portable inter-thread communication mechanism that allows messages to be passed among threads, the portable inter-thread communication mechanism provides each thread with a run method and a dispatch method as well as a queue to hold messages from one thread to another that are waiting to be executed;
      a profiling module that collects application execution information; and
      an application that reads execution logs of an application profiled by the profiling module, extracts profiling information, and creates a graphic representation of the profiled application's execution,
      wherein the profiling module includes a dispatch probe class, which measures the time between an instance of the class's creation and destruction.

2. The system of claim 1, wherein the graphic representation includes a timescale, threads, and arrows pointing from one thread to another indicating that a message was passed among threads or to the same thread.

3. The system of claim 1, wherein the profiling module includes a timing probe class, which is a utility class that indicates whether a user would like to monitor an application's execution.

4. The system of claim 1, wherein the profiling module includes a timing probe context binder which is a function object that wraps a closure with a piece of code that executes a method in the dispatch probe class for creating a timing probe context and log.

5. The system of claim 1, wherein the graphic representation illustrates timing probes that were active on each thread for a specific time period.

6. The system of claim 1, wherein the graphic representation illustrates message traffic among threads.

7. The system of claim 1, wherein the graphic representation illustrates a plurality of threads established by an application.

8. A method for analyzing execution of multi-threaded applications, the method comprising:
   implementing communication among a plurality of application threads by providing each thread with a run method and a dispatch method as well as a message queue and transferring messages as closures;
   receiving an indication that an application should be monitored;
   profiling at least one of the plurality of application threads to monitor and measure the thread's communications; and
   logging information obtained from profiling at least one of the plurality of application threads in an application log, wherein profiling includes a dispatch probe that measures the time between an instance of the dispatch probe's creation and destruction.

9. The method of claim 8, further comprising:
parsing the application log; and
producing a graphic representation based on the parsed application log to illustrate thread execution metrics to a user.

10. The method of claim 9, wherein the graphic representation includes a timescale, threads, and arrows pointing from one thread to another indicating that a message was passed among threads or to the same thread.

11. The method of claim 8, wherein profiling includes a timing probe that indicates whether a user would like to monitor an application's execution.

12. A system for analyzing execution of multi-threaded applications, the system comprising:
one or more processors and
one or more storage devices storing instructions that, when executed by the one or more processors cause the one or more processors to:
implement communication among a plurality of application threads by providing each thread with a run method and a dispatch method as well as a message queue and transferring messages as closures;
receive an indication that an application should be monitored;
profile at least one of the plurality of application threads to monitor and measure the thread's communications; and
log information obtained from profiling at least one of the plurality of application threads in an application log, wherein profiling includes a dispatch probe that measures the time between an instance of the dispatch probe's creation and destruction.

13. The system of claim 12, further comprising:
parsing the application log; and
producing a graphic representation based on the parsed application log to illustrate thread execution metrics to a user.

14. The system of claim 13, wherein the graphic representation includes a timescale, threads, and arrows pointing from one thread to another indicating that a message was passed among threads or to the same thread.

15. The system of claim 12, wherein profiling includes a timing probe that indicates whether a user would like to monitor an application's execution.

* * * * *